Oct. 14, 1969  G. LOCATELLI  3,472,354
DEVICE FOR TRANSFERRING WORK SUPPORTING RODS
BETWEEN ENDLESS CONVEYORS
Filed Oct. 23, 1967  3 Sheets-Sheet 3
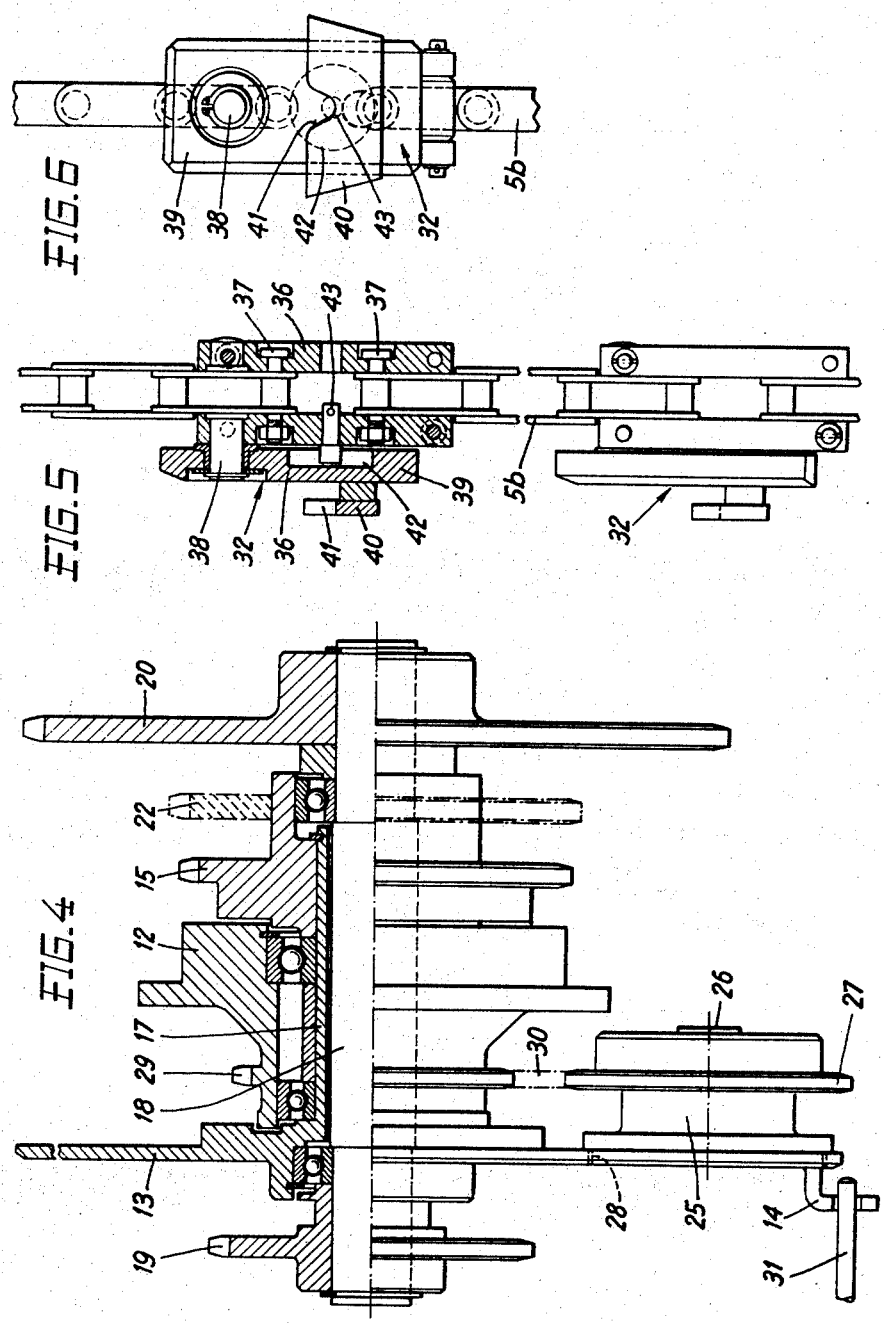
INVENTOR
GIOVANNI LOCATELLI

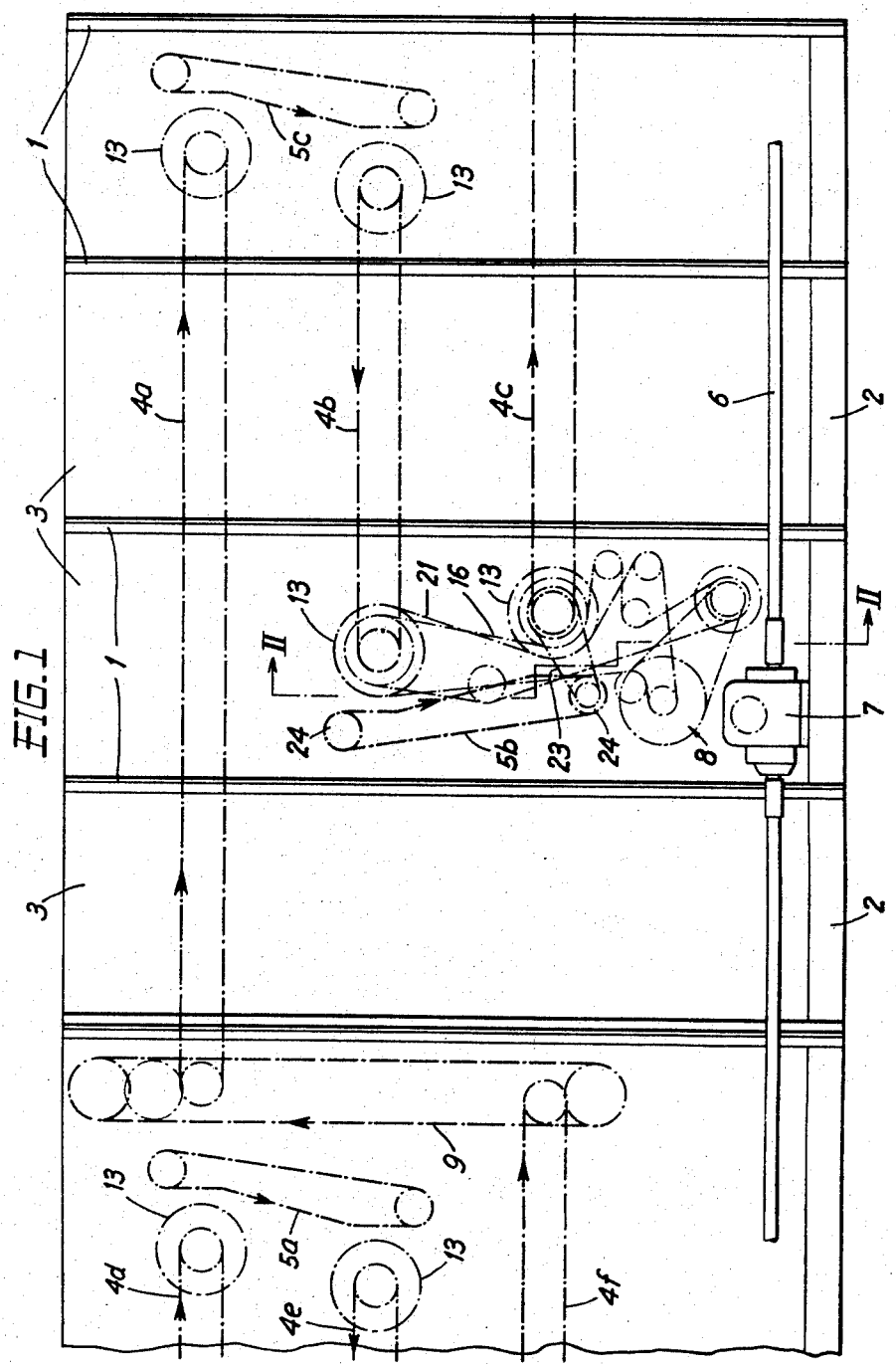

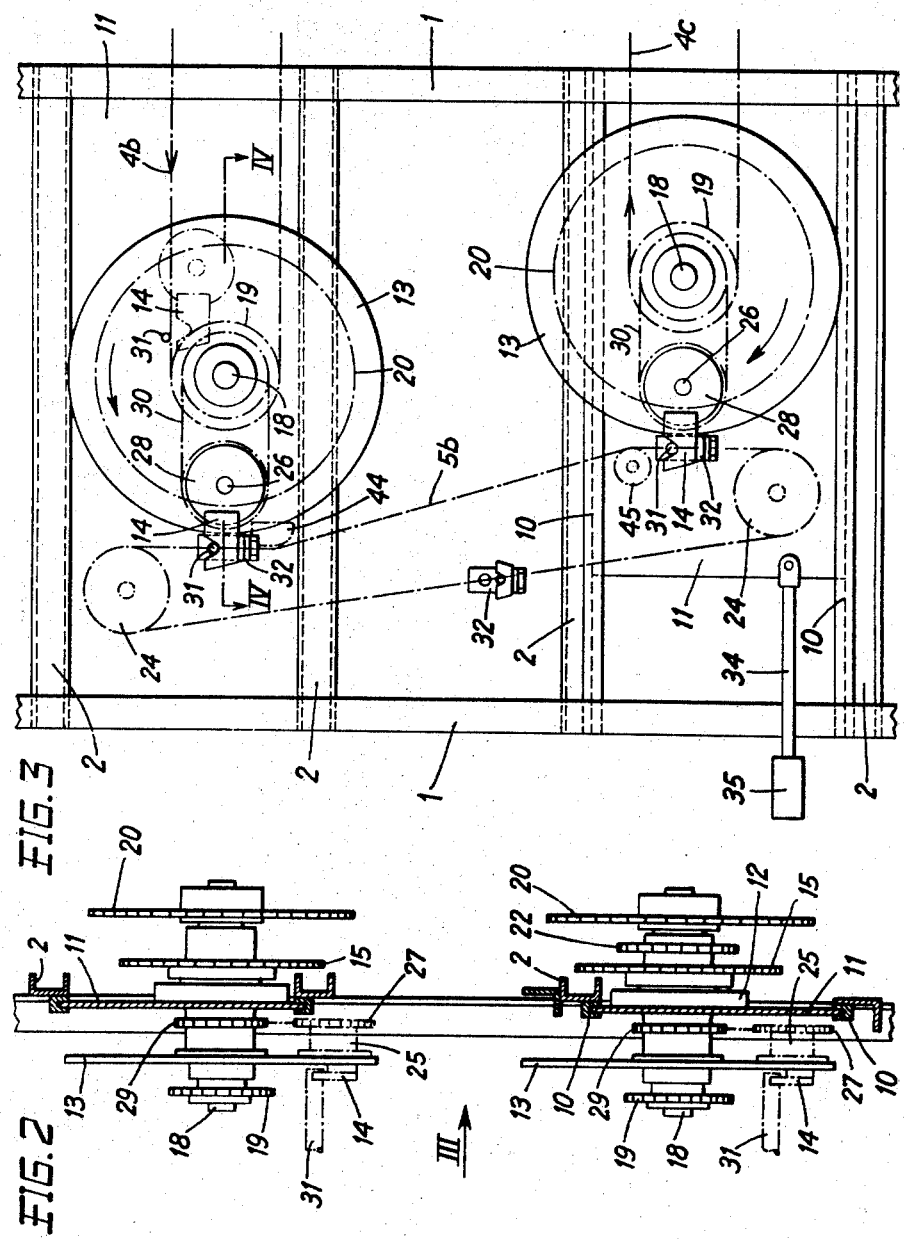

United States Patent Office 3,472,354
Patented Oct. 14, 1969

3,472,354
DEVICE FOR TRANSFERRING WORK SUPPORTING RODS BETWEEN ENDLESS CONVEYORS
Giovanni Locatelli, Uzwil, Switzerland, assignor to Gebruder Buhler AG, Uzwil, Switzerland
Filed Oct. 23, 1967, Ser. No. 677,209
Claims priority, application Switzerland, Oct. 25, 1966, 15,476/66
Int. Cl. B65g 47/00, 37/00
U.S. Cl. 198—25                10 Claims

ABSTRACT OF THE DISCLOSURE

A device for transferring work supporting rods between endless conveyors includes a transfer arm rotatable about an axis coaxial with the axis of rotation of a return sprocket of at least one of two chain conveyors. The transfer arm is secured for rotation with a tubular axle which is rotatably mounted in a stationary support, and an axle for the return sprocket is telescoped through the tubular axle and is rotatable in the latter. The free end of the transfer arm rotatably supports a rod pick up and transport member having fixed thereto a planet gear which is connected by an endless chain to a sun gear fixed to the stationary support. All the components of the transfer device may be supported on a single mounting plate, making a compact structure which can be incorporated as a unit in a conveyor arrangement for carrying elongated dough goods, such as spaghetti, noodles, and the like, through a tunnel drier, with the dough goods being hung over work supporting rods carried by a pair of laterally spaced endless chain conveyors, the rods being spaced longitudinally along the conveyors. The conveyor arrangement includes horizontal conveyors and vertical conveyors, and the transfer devices of the invention transfer the rods from horizontal conveyors to vertical conveyors and vice versa.

BACKGROUND OF THE INVENTION

Long dough goods, such as spaghetti, noodles, etc., after being produced in a continuous process, are dried in tunnel driers by being draped or hung over support rods carried in spaced relation on conveyors running through the tunnel driers, as described, for example, in Swiss Patent No. 269,875. As the drying process takes a considerable time, the dough goods, for the purpose of limiting the length of the tunnel driers to a practical limit, are conducted through the tunnel driers on several superposed levels on endless chain conveyors, the dough goods, suspended on the support rods, being transferred from a conveyor at one level to a conveyor at another level so that they are transported through several vertical spaced passes in the tunnel drier. Thus, the support rods carrying the dough goods are transferred from a first horizontal endless chain conveyor to a vertical conveyor from which, in turn, the support rods are transferred to a horizontal endless chain conveyor at another level either above or below the first horizontal chain conveyor.

Since the dough goods, in the moist state, are extremely sensitive to shock or vibration, the transfer of the support rods from one conveyor to another at the transfer points must be effected with the greatest of care. In turn, this requires that the movement of successive endless chain conveyors between which the rods are transferred, and the movement of the transfer devices, must be synchronized. One solution to this synchronized transfer problem is proposed in French Patent No. 1,176,485, which discloses a rotating disk carrying from one to four gripping members. This rotating disk is arranged symmetrically between the pivot axles of the return sprockets for two successive endless chain conveyors. Through the provision of a planet-type gearing, the gripping members are continuously maintained in a horizontal position during rotation of the disk.

The gripping members lift the rods from one endless chain conveyor and place the rods on the next succeeding endless chain conveyor. The design according to French Patent No. 1,176,485 has the disadvantage that its assembly is time-consuming, as the geometric arrangement of the pivot axles of the return sprockets of the conveyors and of the rotating disk carrying the transfer members must be effected with extreme accuracy. A further disadvantage resides in the bulky construction in the region of the transfer device, the space conditions being only barely sufficient to permit installation of a tensioning device for the chain conveyors and acting on the return sprockets thereof. A similar solution is also proposed in U.S. Patent No. 1,959,799, and has the same disadvantages as just mentioned.

SUMMARY OF THE INVENTION

This invention relates to devices for transferring support rods, carried in longitudinally spaced relation on pairs of endless chain conveyors, to a connecting pair of endless chain conveyors. More particularly, the invention is directed to an improved arrangement of such a transfer device of the type including a rotating arm carrying, at its free end, a gripping member which is always maintained horizontal and operates to lift at least one rod from one pair of endless chain conveyors and to place the rod or rods thus lifted onto a connecting pair of endless chain conveyors.

The present invention is particularly directed to providing a transfer device of the type just mentioned which can be produced as a compact, prefabricated, modular element which can be rapidly installed with easy synchronization between the movements of the endless conveyor chains and the transfer device. For this purpose, the pivot axis for the arm, about which the arm rotates, is arranged coaxial with the axis of rotation of a return sprocket of one of the two endless chain conveyor arrangements between which rods are to be transferred. More particularly, the pivot axis of the rotating rod is a relatively elongated tubular hub or axle which is rotatably supported in a fixed support. The pivot axis of the return sprocket of one of the endless chain conveyor means is the axis of a second axle which is telescoped through the tubular axles and is rotatable relative thereto.

The just mentioned relatively fixed support has fixed thereto a sun gear or sprocket which is non-rotatable and is connected by an endless chain to a planet gear or sprocket fixed to the gripping or lift member which is rotatably mounted in the free end of the rotating arm. The entire assembly, including the fixed support member, may be mounted on suitable means, such as a pair of laterally spaced vertical plates, which are displaceable longitudinally under the action of a chain tensioning means connected between the plates and a fixed part of the tunnel drier.

An object of the invention is to provide improved means for transferring support rods from one endless chain conveyor to another.

Another object of the invention is to provide an improved transfer device for transferring work support rods from one pair of endless chain conveyors to a second pair of endless chain conveyors and which can be produced as a compact, prefabricated, modular element.

A further object of the invention is to provide such a transfer device which can be rapidly installed with easy synchronization of the movement of the endless chain conveyors and the transfer device.

Still another object of the invention is to provide such a transfer device including a rotatable arm whose pivot axis is concentric or coaxial with the pivot axis about

3 which a return sprocket of one endless conveyor chain rotates.

A further object of the invention is to provide such a transfer device which is simple in construction, effective in operation, economical to manufacture and easy to install as a complete unit in a tunnel drier.

BRIEF DESCRIPTION OF THE DRAWINGS

For an understanding of the principles of the invention, reference is made to the following description of a typical embodiment thereof as illustrated in the accompanying drawings.

In the drawings:

FIG. 1 is a partial side elevation view of a drier for dough goods with the transfer device of the invention installed therein, the conveyors and the transfer device being shown somewhat schematically;

FIG. 2 is a vertical sectional view taken along the line II—II of FIG. 1;

FIG. 3 is an elevation view looking in the direction of the arrow III of FIG. 2;

FIG. 4 is a horizontal sectional view taken along the line IV—IV of FIG. 3;

FIG. 5 is a side elevation view, partly in section, of a substantially vertically oriented endless chain conveyor provided with carrying members for the work support rods; and FIG. 6 is a front elevation view corresponding to FIG. 5.

DESCRIPTION OF THE PREFERRED EMBODIMENT

Referring to FIG. 1, the tunnel drier for dough goods is illustrated as comprising a rigid framework including vertically extending supports 1 rigidly connected to longitudinally extending members 2 arranged in vertically spaced substantially parallel relation as illustrated, for example, in FIG. 3. The vertical and horizontal supports are faced with plates 3 forming a closure for the drying zone. Substantially horizontally oriented endless chain conveyor pairs 4 are arranged along the walls of the tunnel drier, in vertically spaced and stepped relation, the pairs of endless chain conveyors being arranged symmetrically with respect to a vertical plane including the longitudinal axis of the tunnel.

The individual horizontal endless conveyor chain pairs such as 4a, 4b and 4c, or 4d, 4e and 4f, are interconnected by substantially vertically oriented conveyor chain pairs such as 5a, 5b and 5c. The substantially vertical endless chain conveyor pairs 5 are arranged in such a way that they receive the conveyed material from one horizontal endless conveyor chain pair 4 and transport the conveyor material to the next higher or next lower horizontal endless chain conveyor pair 4. The movement of the various horizontal and vertical endless conveyor chain pairs 4 and 5, respectively, as well as the movement of the transfer devices in the transfer zone interconnecting one conveyor chain pair to another, is completely synchronized. For this purpose, a central or main drive shaft 6 is provided actuating intermediate drive 7 of which only one is shown in the drawings. Through the medium of the chain drive 8, the illustrated intermediate drive 7 drives the return sprockets of horizontal endless chain conveyor pairs 4b and 4c and vertical endless chain conveyor pair 5b.

The transport of the support rods 31 carrying the dough goods, illustrated more particularly in FIG. 3, takes place in a tunnel drier, such as shown in FIG. 1, in the following manner: Rods 31 are transferred from horizontal chain conveyor pair 4d to vertical chain conveyor pair 5a, from which they are passed on to horizontal chain conveyor pair 4e, which is only partially illustrated. At the non-illustrated other end of endless chain conveyor pair 4e, rods 31 are transferred by another vertically oriented endless chain conveyor pair (not shown) to horizontal endless chain conveyor pair 4f. From chain conveyor pair 4f, the rods are transferred to a vertical lift 9, which can also comprise an endless chain conveyor pair, and which conveys the rods to horizontal chain conveyor pair 4a. Through the medium of vertical chain conveyor pair 5c, the rods are transported to horizontal chain conveyor pair 4b and, from the latter, through vertical chain conveyor pair 5b, to horizontal chain conveyor pair 4c. Chain conveyor pair 4c can either transport the rods out of the tunnel drier or transfer the same, in a manner analogous to that described for chain conveyor pair 4f, to another vertical lift similar to the vertical lift 9.

FIGS. 2 and 3 are enlarged views of a detail of FIG. 1, in which vertical chain conveyor pair 5b is fully visible and horizontal chain conveyor pairs 4b and 4c are partially visible. The transfer devices for transferring rods from conveyor chain pair 4b to conveyor chain pair 5b, or for transferring rods from conveyor chain pair 5b to conveyor chain pair 4c, are designed in essentially the same manner so that the following description will be limited to the lower of the two transfer devices shown in FIG. 3, and only the structural differences will be specifically mentioned.

In the longitudinal members 2 of the framework which extend between vertical supports 1, there are arranged guideways 10 in which a plate-shaped drive support 11 is mounted for displacement in the conveying direction of endless chain conveyor pair 4c. A bearing body 12, illustrated more particularly in FIGS. 2 and 4, is arranged in support plate 11. Bearing body 12 rotatably supports an arm 13 carrying gripping members 14, the arm 13 having a relatively elongated tubular axle 17 rotatable in the support 12. A sprocket 15 is secured to axle 17 to rotate therewith, and arm 13 is driven by a chain 16 trained around sprocket 15.

As more clearly apparent in FIG. 4, the pivot axle 17 of arm 13 is mounted in bearing body 12 in turn supported on drive support plate 11, and axle 17 is a tubular shaft in which is mounted, for rotation relative thereto, an axle 18 affixed to a return sprocket 19 of a chain conveyor. Sprocket 19 is fixed to one end of axle 18, and a sprocket 20 is fixed to the other end thereof. Sprocket 20 has trained thereover a chain 21 (FIG. 1) for driving the chain conveyor return sprocket 19. Another sprocket 22 is fixed to axle 17 of arm 13 and, through a chain 23 (FIG. 1), drives a sprocket fixed to the axle of return sprocket 24 of chain conveyor 5b so that sprocket 22 drives return sprocket 24.

Arm 13 is designed as a circular disk which serves as a transfer device for the rods 31. A bearing 25 is fixed to arm 13 in radially spaced relation to the pivot axis of arm or disk 13. Bearing 25 rotatably mounts a shaft 26 to which are fixed a sprocket 27 and a disk 28 (FIG. 3). Disk 28 carries the gripping or rod support members 14. Fixed support 12 is formed with a series of teeth 29 constituting a sprocket serving as the sun gear or sprocket for sprocket 27 serving as the planet gear or sprocket. A chain 30 interconnects sun sprocket 29 with planet sprocket 27. When arm 13 is rotated about the axis of its axle 17, the planet gear arrangement 27–29–30 maintains gripping or rod support members 14 constantly in the illustrated horizontal position.

With the chain conveyors and the transfer devices moving in the direction of the arrows shown in FIG. 3, members 14 lift rods 31 from chain conveyor pair 4b at the position illustrated in dash and dot lines in FIG. 3. The members 14, always maintained horizontal by planet gearing 27–29–30, transfer a rod 31, lifted from chain conveyor pair 4b in the dash and dot line position, to carrying elements 32 secured to chain conveyor 5b, in the solid line position of FIG. 3. The peripheral speed of the upper arm 13 in FIG. 3 is somewhat greater than the speed of travel of chain conveyor par 5b so that, upon transfer of a rod 31 to chain conveyor pair 5b, gripping members 14 overtake carrying elements 32 with a slight relative velocity and place rod 31 on carrying elements 32 substantially without any shock of vibration.

In the zone of the lower arm 13 of FIG. 3, rod 31 is placed by carrying element 32 on gripping members 14 and, after substantially only one half a revolution of arm 13, rod 31 is placed on chain conveyor pair 4c.

Each of the return sprockets 24 of chain conveyor pair 5b is rotatably mounted on a drive support 11, and only the lower return sprockets are driven. A sprocket (not shown) is fixed to the axle of the lower return sprockets 24 and is connected to sprocket 22 (FIGS. 2 and 4) by a chain 23 (FIG. 1). Sprocket 22 is fixed to axle 17 so that, upon rotation of arm 13, return sprockets 24 and thus conveyor chain pair 5b are driven synchronously with arm 13.

In FIG. 3, the design of the upper transfer device differs from that of the lower transfer device mainly in that the upper drive support plate 11 is fixed against longitudinal displacement whereas the lower drive support plate 11 is longitudinally displaceable in guidways 10. The lower drive support plate or plates 11 are connected with piston rod 34 of a pneumatic cylinder 35. Thereby, a constant chain tension can be exerted on chain conveyor pair 4c by a constant fluid pressure in cylinder 35. When the length of chain conveyor pair 4c changes, the lower sprockets 24 of chain conveyor pair 5b swing around the axis of the upper return sprockets 24 rotatably mounted on fixed upper drive support plate 11. As best seen in FIG. 3, each chain conveyor 5b is guided rectilinearly, in the transfer zones of rods 31, by guides 44 and 45 secured to drive support plates 11. These guides may be designed as a rigid guide track 44 or as a free-running guide roller 45. By virtue of the guides 44 and 45, a constant mutual spacing between conveyor chains 4b and 5b, or between conveyor chains 5b and 4c, in the transfer zone is insured despite a pendulum motion of conveyor chain pair 5b.

The concentric or coaxial arrangement of the axle 17 of arm 13 and the axle 18 of return sprocket 19 on drive support 11 makes it possible to produce arm 13, return sprocket 19 and drive support 11 as a prefabricated, compact and easily transportable unit. This facilitates installation upon assembly, and facilitates synchronization between the movement of chain conveyor 4c and arm or disk 13. Furthermore, the concentric arrangement of the two axles is so space-saving that mounting of the return sprockets 24 of conveyor chain pair 5b on plate 11, together with their guides (not shown), is also possible without impairing the compact design and easy handling of the assembly as a structural element. This has the advantage that, upon assembly according to the geometrically correct arrangement of drive support 11, return sprockets 24 and 19, and arm 13, are positively aligned, and only the synchronization between conveyor chain pairs 4b, 4c and arms 13 need be adjusted or checked.

FIGS. 5 and 6 show a detail of a chain conveyor 5b having the rod carrying elements 32. Plates 36, acting as links in the chain, are fastened to chain 5b by means of hinge pins 37. A cylindrical bolt 38 is fixedly connected with the front plate 36, and a swinging body 39 is articulated on bolt 38. Due to its dead weight, body 39 always adjusts itself to a vertical position. Body 39 has fixedly connected to it a carrying arm 40 formed with the recess 41 for picking up rods 31. In its surface facing front plate 36, body 39 is formed with a cylindrical bore 42 in which there is engaged a pin 43 fixedly connected with front plate 36. Pin 43 serves as a stop to limit the lateral pendular motion of swinging body 39. This arrangement provided, in the transfer or take-over zone of rods 31, and on the conveyor path between the take-over zone and the transfer zone, a constant horizontal orientation of carrying arm 40.

It will be clear to those skilled in the art that carrying arm 40 could be formed with several recesses 41 for simultaneously carrying several rods 31. Chain 5b carries three rod-carrying elements 32. The arrangement of several carrying elements 32 on chain 5b permits a lower running speed of the chain, whereby less shock or vibration upon transfer of rods 31 is insured.

What is claimed is:

1. In a device for transferring work-supporting rods, carried in longitudinal spaced relation on one pair of endless chain conveyors having drive sprockets rotatable about a sprocket axis, to a succeeding pair of endless chain conveyors having drive sprockets rotatable about a sprocket axis, and of the type including transfer arm means, support means rotatably mounting the arm means for rotation about an arm means pivot axis, a rod gripping member on the transfer arm means in radially spaced relation to the pivot axis thereof and operable to lift at least one rod from the one pair of conveyors and place each lifted rod on the succeeding pair of conveyors and means maintaining the gripping means constantly horizontally oriented: the improvement in which the arm means pivot axis is the axis of a rotatable axle to which said arm means is fixed, and said rotatable axle is concentric with another rotatable axle whose axis is one of said sprocket axes.

2. In a device for transferring work-supporting rods, the improvement claimed in claim 1, in which said rotatable axles are rotatably supported in a rigid drive support forming part of said support means.

3. In a device for transferring work-supporting rods, the improvement claimed in claim 2, including means rotatably mounting the drive sprockets of the other pair of chain conveyors on said drive support.

4. In a device for transferring work-supporting rods, the improvement claimed in claim 3, in which said support means includes guides mounted on said drive support in operative relation with at least one of said pairs of endless chain conveyors in the transfer zone in which said arm means is operable, said guide means constantly maintaining a fixed mutual spacing between said pairs of endless chain conveyors.

5. In a device for transferring work-supporting rods, the improvement claimed in claim 1, in which said transfer arm means comprises a circular disk.

6. In a device for transferring work-supporting rods, the improvement claimed in claim 2, in which said support means includes a bearing body rotatably mounting the axle of said transfer arm means; the axle of said transfer arm means comprising a tubular shaft and the axle constituting said one sprocket axis being telescoped through said tubular shaft and mounted for rotation relative to said tubular shaft.

7. In a device for transferring work-supporting rods, the improvement claimed in claim 6, in which said bearing body has a series of sprocket teeth thereon forming a sun sprocket; said rod gripping member being pivotally mounted on said transfer arm means and including a planet sprocket rotatable therewith; and drive means interconnecting said sun sprocket and said planet sprocket.

8. In a device for transferring work-supporting rods, the improvement claimed in claim 2, in which said support means includes stationary guides extending in the conveying direction of that pair of endless chain conveyors whose drive sprocket axis is concentric with the pivot axis of said transfer arm means; said drive support being mounted in said stationary guides for displacement therealong; and pneumatic cylinder-piston means connected between said drive support and a fixed portion of said support means for maintaining a constant tension on said that pair of endless chain conveyors responsive to a constant fluid pressure within said piston-cylinder means.

9. In a device for transferring work-supporting rods, the improvement claimed in claim 1, in which one pair of endless chain conveyors extends in a direction inclined to a horizontal plane and includes rod carrying elements; each rod carrying element including a swinging body pivotally suspended on the associated chain of said inclined pair and a carrying arm on said swinging body formed to pick up at least one rod end; said swinging body gravitationally orienting itself vertically and acting in the nature of a pendulum.

10. In a device for transferring work-supporting rods, the improvement claimed in claim 9, including stop means operatively associated with each swinging body and limiting pendulum motion thereof.

References Cited

UNITED STATES PATENTS 2,965,214  12/1960  Schlumpf _____ 198—25

EDWARD A. SROKA, Primary Examiner

U.S. Cl. X.R.

198—85